Patented Aug. 10, 1926.

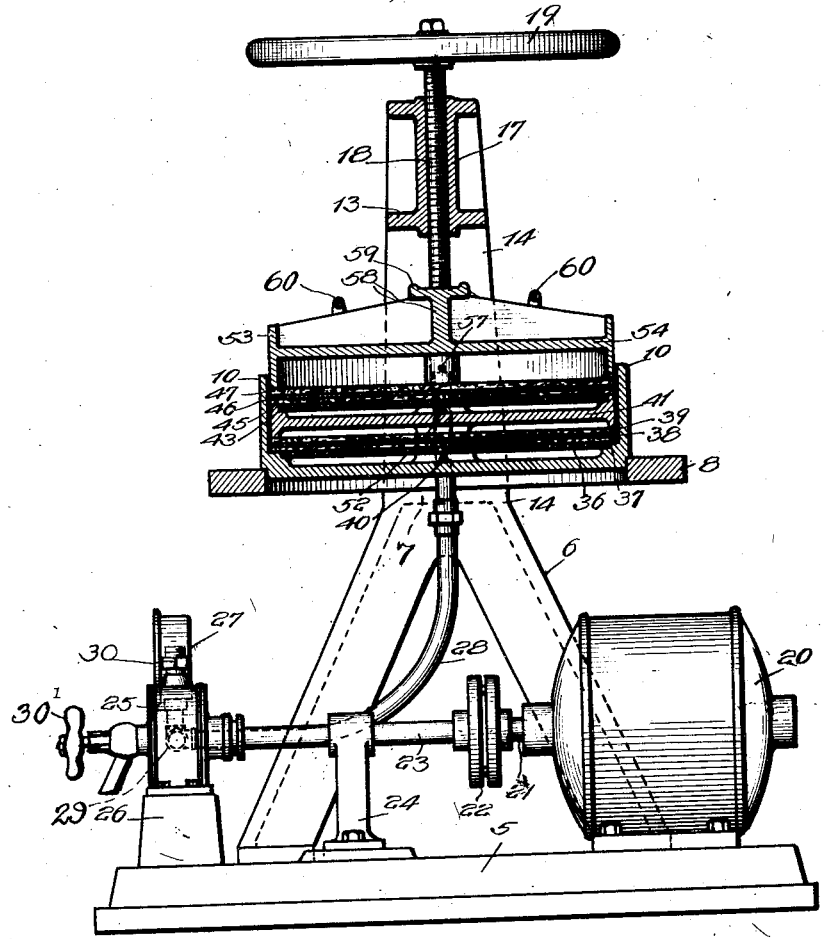

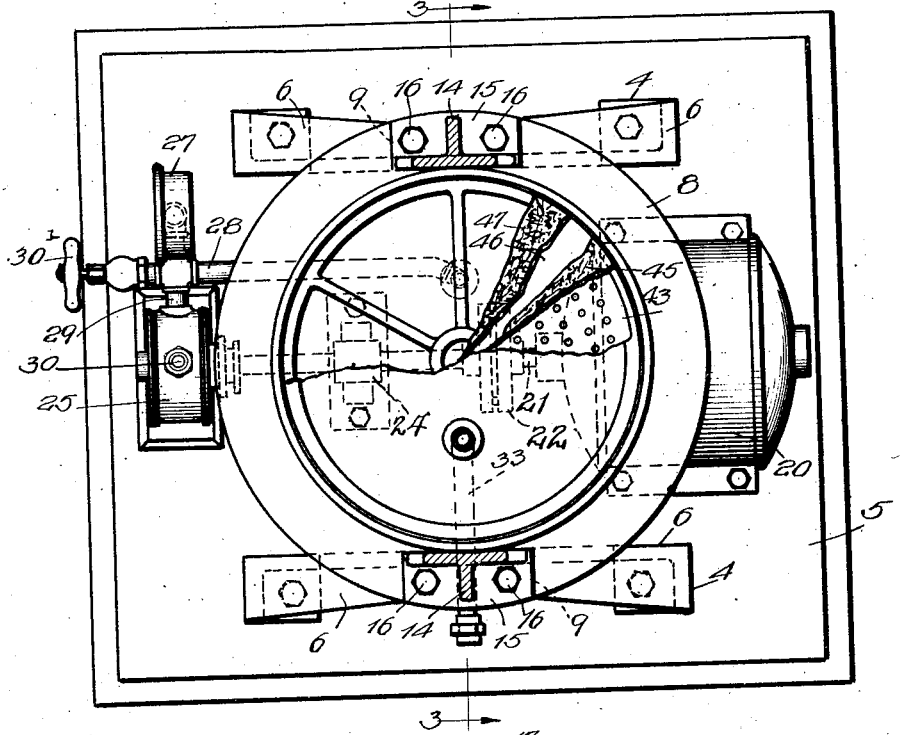

1,595,345

UNITED STATES PATENT OFFICE.

FRANK B. LOMAX, OF CHICAGO, ILLINOIS.

FILTER.

Application filed September 29, 1924. Serial No. 740,433.

My invention relates to filtration and more particularly to a filter especially designed for use in connection with the making of syrup as used in connection with beverages and at soda fountains, although not restricted to this particular use, and has reference more specifically to an improved and compact apparatus employing a superior and novel method of separation upon which the present application is an improvement, and set forth in my prior application Serial No. 689,632 filed Jan. 31, 1924.

Among the objects and advantages of the invention are the provision of a filter of simplified construction and design which provides for the protection of the filtering elements from shock; the automatic apportionment of a single pump between the work of drawing in the supply and the work of forcing the material through the filter as well as sealing the filter against leakage, but more especially, to provide novel supply means or inlets and discharge means or outlets whereby the mass or syrup is more thoroughly filtered and cleaned of fine particles or dirt and the filtering action hastened, as well as rendering the parts capable of being readily assembled or disassembled and facilitating cleaning thereof and the maintainance of sanitary condition as well as providing for greater output or filtering capacity and more economical operation.

With the above and other objects in view, the invention consists of certain novel combinations and arrangements of parts to be hereinafter more particularly set forth and described.

In the accompanying drawings:

Figure 1 is a vertical sectional elevation through the novel filter of my invention;

Fig. 2 is a plan view thereof partly in section and broken away to disclose the filter proper; and Fig. 3 is an enlarged fragmentary vertical sectional view of the filtering parts proper taken at right angles to these parts as shown in Fig. 1 of the drawings.

Referring to the drawings in detail, in which like reference characters designate corresponding parts throughout the several views, the novel filter includes a base 5 upon which a pair of standards 6 are mounted or bolted in upright position and in spaced relation. These standards constitute a part of the frame of the machine and are preferably of inverted V-shaped formation, being bifurcated lower portions of the sides of the frame designated generally at 4. The standards 6 have horizontal top portions 7 upon which is arranged an annular frame or ring 8 bearing apertured lugs 9 extending outwardly at diametrically opposite sides of a lower cup or cylindrical filter section 10 having the bottom wall 11 and provided with the recesses 12 forming rabbets to fit the ring 8, the shoulder formation thus provided, seating and fitting snugly within the ring 8 at the bottom 11 of the cup or filter section 10 at its surrounding edge portion beneath the lugs or ears 9.

An inverted U-shaped frame member or yoke 13 has its sides or depending legs 14 straddling the cup 10 and the apertured lower ends or feet 15 thereof bolted to the parts 7, 8 and 9 as indicated at 16. The yoke 13 is preferably of ribbed cross section, being provided with three flanges or webs to give the desired strength consistent with lightness in weight, and formed with an internally threaded sleeve 17 at the intermediate part of the top or cross member of the yoke, which cross member or bar extends horizontally between the sides 14 and is arranged over the filter member proper. As shown in Fig. 1 of the drawings, the top cross member of the yoke 13 of the frame 4 is preferably of I-shaped cross section, though it may be of other suitable cross section or construction, as desired.

The sides 14 are shown in T-shaped cross section, but may be of any other suitable construction. A screw 18 is engaged through the sleeve 17 and controlled or operated by a hand wheel 19 for the purpose of holding the parts assembled and exerting pressure between the filtering elements to secure an efficient filtering action and prevent leakage, in a manner to be hereinafter more fully described. The base 5 is adapted to support a motor 20 preferably an electric motor controllable by a suitable button switch or otherwise and having its shaft 21 connected by a clutch or coupling 22 with a shaft 23 horizontally journaled in a bearing 24 secured to the base 5. The opposite end of the shaft 23 connects to a suction pump 25 mounted upon a bed or block 26 and provided with a gauge 27 to indicate the suction or vacuum pressure in the intake pipe 28 of the pump, which constitutes the discharge or outlet for the filter proper and has a lateral extension connected to the pump as shown at 29. The discharge end of the pipe 28 has a drain valve or faucet 30 for flushing the same. Pump 25 is provided with an outlet 30 for connection to suitable piping whereby the syrup may be discharged into suitable containers for storage or shipment purposes, or recirculated or returned to the filter for refiltering thereof as shall be found necessary or desirable.

The lower cup or section 10 of the filter proper is provided at diametrically opposite points spaced from the lateral wall or side, with upwardly extending apertured bosses 31 and 32, the former receiving through its aperture, an inlet pipe 33 through which the syrup or other matter to be filtered is supplied by gravity or pressure, or solely by suction created by the pump 25 through the medium of its connection through the pipe 28 extending upwardly through the aperture of the boss 32 constituting the outlet of the filter. In fact, the supply of the liquid may be caused through the siphon action created by the suction or tendency to produce a vacuum within the filter chambers.

The bottom 11 is provided with steps or shoulders around the bosses 31 and 32 as indicated at 34, these parts being located in diametrical alignment, and the internal surface having similar shoulders or steps 35 upon which a foraminated metal plate 36 is supported in the cup 10 having openings receiving the bosses 31 and 32 and providing a chamber or lower compartment between the bottom 11 and the plate 36. This provides a substantially flat supporting surface for the lower filtering medium including a lower pad 37 such as felt, upon which is arranged a primary filtering element 38 such as filter paper and a top or preliminary pad 39 also preferably of felt and of slightly greater thickness than the primary filtering element 38. These filtering members are provided with openings which fit over the pipes 28 and 33, the upper ends of the vertical portion of the latter extending sufficiently high to project above the filter proper when in position. Openings 40 are provided leading from the bottom chamber in inclined positions through the boss 32 and outlet pipe 28 to drain the lower chamber of the filtrate.

A relatively thick and heavy metallic plate or disc 41 is mounted on the pad 39 within the cup 10 and is provided with peripheral flanges 42 projecting above and below and engaging the filter pad 39 to space the plate from the latter and provide a chamber above the lower filter element and a chamber above the plate 41 and a corresponding filtering medium mounted thereon. The latter includes a foraminated plate 43 of non-rusting metal or the like, seated in an annular shoulder or rabbet recess 44, formed in the top of the upper flange by an internal annular projection of the peripheral flange, upon which rests a felt pad 45 upon which is, a filtering element 46 such as filter paper, over which is arranged another preliminary filtering element 47, also preferably of felt. The plate 41 has openings aligning with the apertures or openings of the bosses 31 and 32, being provided with upwardly and downwardly extending bosses 48 and 49. The pipe 33 extends up into the aperture of the boss 49 and the latter is provided with inclined outwardly extending passages 50 and a short tube or pipe 51 extending from above the inner upper ends of the passages 50 through the plate 43 and filtering members 45, 46 and 47 to a point slightly above the same. The boss 49 has downwardly and inwardly inclined passages 52 extending from the chamber above the plate 41 into the passage of the boss 48 where they communicate with the outlet pipe 28, as distinguished from the passages 50 which extend into the lower chamber while the upper chamber is cut off from communication with the inlet pipe 33 or its extension 51.

An upper cup or cylindrical filter section 53 cooperates with the lower cup or section 10 and fits within the latter as shown, thus cooperating to produce the filtration chambers. The top of the cup 53 is designated at 54 and the cylindrical portions or lips extending upwardly from the bottom cup and downwardly from the top cup telescope one within the other and form a chamber of considerable depth beneath the top 54. The latter is also provided with cylindrical projections 55 and 56 respectively, extending down to engage the felt pad 47, the former fitting around the upper end of the pipe extension 51 and both having outwardly inclined passages 57 through their respective walls. The top of the cup 53 is provided with stiffening and reinforcing webs 58 and a central boss 59 engaged by the lower end of the screw 18 so that when the parts are assembled and the screw is operated, downward pressure is exerted on the filtering mediums by engagement of the annular flange portion of the cup 53 and the projections 55 and 56 with the upper filter pad 47. This insures uniformity of pressure and action throughout the area of the filtering elements. It is also apparent that this pressure is transmitted through the plate 41 positioned intermediate the filtering mediums spaced apart as related, to insure uniformity of pressure and action of the lower filtering device. If desired, handles 60 may be provided upon diametrically opposite sides of the upper cup section 53 on the vertical reinforcing web structure 58, so that when the screw is turned by the wheel 19 to relieve the filter of pressure between the cup and parts held associated therebetween, the upper cup may be readily displaced or removed and conveniently handled. The other parts can then be removed for the purpose of cleaning, replacement or repair, though the latter is unlikely, in view of the fact that the parts are so constructed as not to be likely to get out of working order.

The operation of the device is substantially the same as that set forth in my prior application hereinbefore referred to, but in the present device, the particular units illustrated operate preferably by suction at pressures which will be usually below atmosphere within the filtration chambers, and a liquid seal may be provided between the annular spacing or sides of the cup to prevent air from entering through the filtering element or to determine when there is any leakage. Ordinarily, however, the pressure provided by the screw will be sufficient to provide an air-tight joint and prevent leakage of air into the system.

To start the operation, the parts may be removed if desired for priming, and the cup 10 provided with a small quantity of liquid in the bottom, although this is not necessary. The parts are then placed in position and the suction pump 25 started. The initial withdrawal of the material from the bottom chamber of the cup 10 will draw the atmospheric air in the cup 53 and the intermediate chambers, through the filtration barrier until a vacuum is created in said cup and chambers sufficient to overcome the difference in head between the supply pressure through the inlet 33 and the chambers. This immediately results in a supply of liquid being discharged into the top chamber above the felt pad or disc 47 and the alternate chamber below the plate 41 with which the inlet communicates, the other chambers being cut off from the inlet and having communication with the outlet as previously described and as clearly shown in Fig. 3 of the drawings. This liquid spreads out over the filtration barriers or filters proper, forming an effective seal to prevent the withdrawal of more air from the cups or chambers and continued operation of the pump will continue to draw the liquid into the chambers with which the inlet communicates and the difference in pressure will be effective to force the liquid through the filters into the other chambers respectively located thereunder for discharge through the passages 40 and 52 into the outlet 28. The passages or openings 50 provide for the escape of the liquid through the annular wall 55 and the openings or passages 57 to provide for the escape of air within the annular wall 56, or chambers produced thereby. Thus, it will be apparent that as long as a vacuum is maintained in the chambers beneath the filtration barriers by the suction created in the pipe 28, and the tendency to produce a vacuum therein, sufficient to compel a flow through the inlet 33, the liquid seal will be maintained and a discharge by percolation through the filtration barriers will continue. The power of the pump will be utilized to maintain the pressure difference and to cause the automatic continuance of the operation should the liquid level in the source of supply drop, or for any other reason, the supply should become less than the delivery through the filtration barriers. In this way, the apportionment of the power of the motor or source 20 is automatically varied in accordance with the conditions of operation, as much power as may be needed being employed to draw the material into the filtration chambers and the balance being effective on the filtration barriers themselves. By the device of this invention, the filtering of the syrup or liquid mass may be quickly carried on and a maximum volume of pure, clear fluid in a given time interval will result. The larger particles will be caught by the felt pads and entangled or trapped in the fibres thereof as preliminary filtering elements and will constitute a major portion of the total mass of material removed by filtration while the remainder will be deposited on the surfaces of the primary filtering elements or filter papers previously described, thus permitting the operation for a longer period than would otherwise be possible since the coarser mass is prevented from clogging the primary filtering elements.

While I have described what I now consider to be the preferred form of my invention, it is to be understood that changes in the details of construction may be resorted to without departing from the spirit and scope of the invention as defined by the following claims.

I claim:

1. In combination, a frame including a stand having a top portion, a lower cup having lugs connected to the sand through the top portion, an upper cup telescoping the lower cup, a yoke straddling the said cups and secured to the said top portion, a partition disposed intermediate the cups, filtering elements between the partition and the cups forming spaces above the filtering elements, an inlet extending up through the lower cup and partition and communicating with the spaces above the filtering elements and means on the yoke for engaging the upper cup and exerting a pressure on the elements and partition against the lower cup.

2. In combination, a container open at the top, shoulders formed on the bottom of said container, a filtering element disposed in said container and supported on the said shoulders, which space it from the bottom of the container, another filtering element disposed in the said container, a partition between the elements providing spaces between it and the elements, a member telescoping the said container and resting on the said last mentioned and upper filtering element, an inlet passing through the elements and partition communicating with a space intermediate one of the elements and the container, and a space formed by the partition intermediate the partition and the other element, an outlet communicating with the other spaces in the said container and means for exerting a pressure on the said telescoping member to press the elements and partition together and form a seal in the said container.

3. In combination, a container, a lower filtering element disposed in the said container, shoulders formed on the bottom of the container for supporting and spacing the said element from the bottom of the container, an upper filtering element disposed in the said container, a partition between the elements providing spaces between it and the elements, a cup-like member telescoping the said container supported on and spaced from the said upper element, means for applying pressure to the said member for pressing the elements and partition tightly together in the said container to form a seal, an inlet passing through the bottom of the container, the lower element, the partition, and the upper element for communicating with the spaces above each of the elements, said inlet being connected externally of the container to a fluid supply, an outlet passing through the bottom of the container, the lower element and the partition for communicating with the spaces below each of the elements, and suction means connected to the outlet externally of the container for causing part of the fluid to be drawn from the inlet through the lower element and another part of the fluid to be drawn from the inlet through the upper element, all of the resultant filtrate being sucked out of the container through the said outlet.

4. In combination, a frame including a stand having a top portion, a lower cup having lugs connected to the stand through the top portion, an upper cup telescoping the lower cup, a yoke stradling the said cups and secured to the said top portion, a partition disposed intermediate the cups, filtering elements between the partition and the cups, an inlet extending up through the lower cup and partition and communicating with the spaces above the filtering elements, an outlet extending up through the partition and communicating with the spaces below the filtering elements, a pump mounted on the said stand connected to both the outlet and inlet for generating a partial vacuum in the said cups to cause liquid to be sucked from the inlet through both the elements and to cause the resultant filtrate to be drawn out of the cups through the outlet, and means on the yoke for engaging the upper cup and for exerting pressure on the elements and partition against the lower cup to form a seal in said cups.

In witness whereof, I hereunto subscribe my name this 26 day of Sept., 1924.

FRANK B. LOMAX.